Feb. 23, 1926.

H. O. HEM

WEIGHING SCALE

Filed June 13, 1921    2 Sheets-Sheet 2

1,574,090

Inventor

Hallor O. Hem

C O Marshall
Attorney

Patented Feb. 23, 1926.

1,574,090

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed June 13, 1921. Serial No. 477,150.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to automatic weighing scales, and particularly to the construction of the tare beam lever and the device for locking the same against movement.

One of its principal objects is the provision of means for properly positioning the tare beams on the lever.

Another object is the provision of means for elevating the tare beam lever and properly co-ordinating the elevating means with means for locking the automatic load-offsetting mechanism so that the elevation of the tare beam lever and the locking of the load-offsetting mechanism will take place in proper sequence.

Other objects and advantages will be apparent from the following description, in which reference is had to the accompanying drawings illustrating a preferred embodiment of my invention and wherein similar reference numerals designate similar parts throughout the several views.

In the drawings:—

Figure 1:
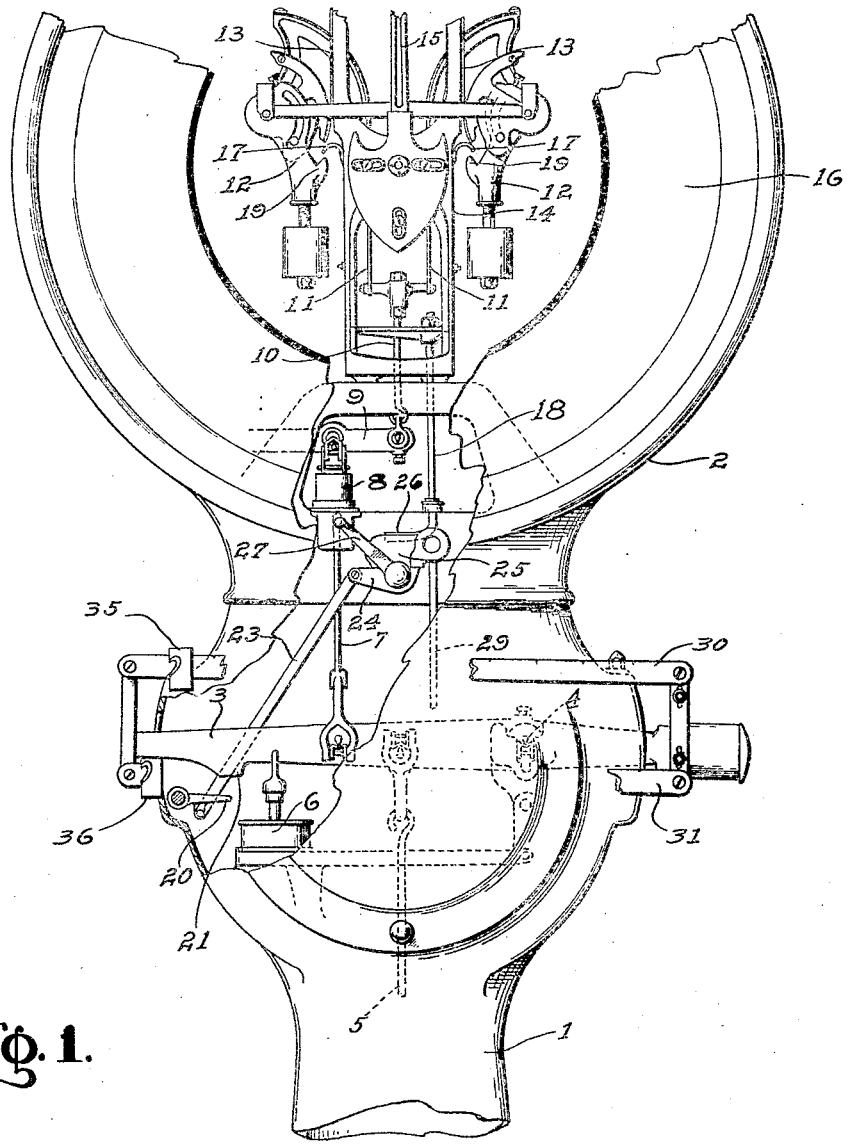
Figure 1 is an elevational view of a portion of a weighing scale embodying my invention, parts being broken away to more clearly show the mechanism.

I have shown my invention as embodied in a scale of the type described in detail in my co-pending application Ser. No. 433,919, filed Dec. 29, 1920. In this type of scale the tare beam and automatic load-offsetting mechanism are supported by a hollow column 1 surmounted by a substantially watch-casing-shaped housing 2. The tare beam lever 3 is fulcrumed, as at 4, in the upper end of the column and is connected to the platform lever mechanism (not shown) by means of a steelyard rod 5. The tare beam lever is also connected to a dash pot 6 which serves to dampen the vibration of the scale.

Extending upwardly from the tare beam lever is a tension rod 7 which, after passing through an oil seal 8 in the lower wall of the housing 2, is pivotally connected to a short lever 9 fulcrumed within the housing 2. The lever 9 is connected by means of a link 10 and a pair of flexible metallic ribbons 11 to oppositely swinging load-offsetting pendulums 12. These pendulums are supported by means of flexible metallic ribbons 13 upon a frame 14 secured within the housing 2.

When a load is placed upon the platform (not shown) of the scale a downward pull is exerted upon the steelyard rod 5, thereby rocking the tare beam lever 3 and pulling downwardly upon the tension rod 7, the short lever 9, the link 10 and ribbons 11 and causing the pendulums 12 to swing outwardly until the load on the platform is offset. The pendulum mechanism is suitably connected to an indicator hand 15 which indicates the weight of the load on the platform upon the dial 16.

In order to prevent injury to the mechanism of the scale while it is being moved from place to place, means is provided for locking the pendulum mechanism against movement. This locking means, as shown in my co-pending application, consists of a pair of hooks 17 which, when the rod 18 is moved downwardly, are forced into engagement with lugs 19 on the pendulum 12 by suitable springs (not shown), thereby holding the pendulums in their lowermost positions. It is evident, however, that these hooks can engage the lugs 19 on the pendulums only when the pendulums are in their lowermost positions. The pendulums may be allowed to fall into their lowermost positions by raising the tare beam lever 3, and the operating mechanism for the locking device is, therefore, also connected to means for raising the tare beam lever.

Figure 2:
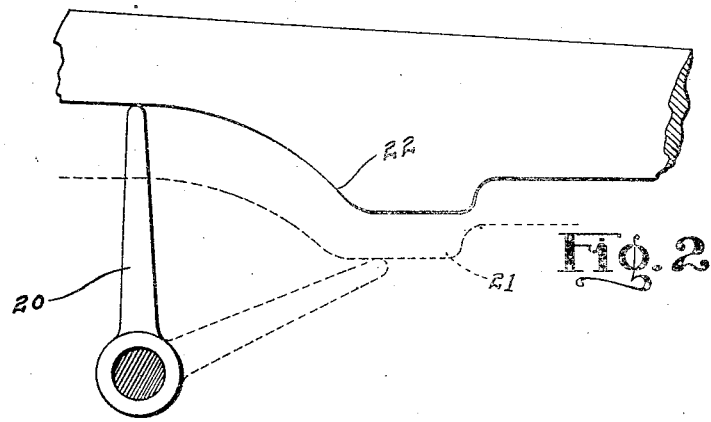
Figure 2 is an enlarged fragmentary detail view of the beam elevation and locking means.
Figure 3:
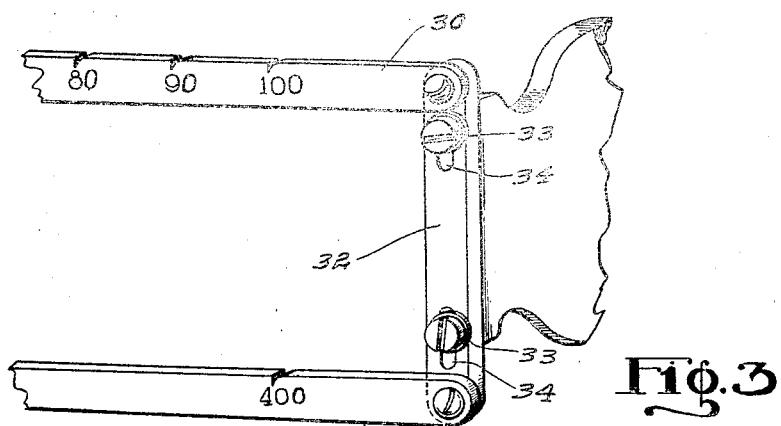
Figure 3 is an enlarged fragmentary perspective view showing the means for properly positioning the tare beams.

The means for raising the tare beam lever consists of a finger 20 pivotally mounted in the upper end of the column 1. When the finger 20 is in the horizontal position shown in Figure 1 it is out of engagement with the tare beam lever. When, however, it is swung upwardly it engages a downwardly projecting portion 21 of the lever. If the lever be in lowered position this engagement takes place very soon after the beginning of movement of the finger. Continued upward movement of the finger raises the tare beam lever sufficiently to allow the pendulums to drop to their lowermost positions, and when the lever has been thus raised the finger 20 slips from under the downwardly projecting portion 21 and follows the arcuate face 22 (see Figure 2). It is apparent from the above statement of operation that the tare beam lever is raised to its uppermost position during the first part of the movement of the finger 20 and is thereafter held in this elevated position by engagement of the end of the finger with the arcuate face 22 of the downwardly projecting portion.

The finger 20 is connected by means of a link 23 to an arm 24 which is pivoted at the upper end of the column 1, the arm 24 being operatively connected to a cam 25 which engages a laterally extending foot 26 on the lower end of the rod 18. When the cam 25 is turned to the right the rod 18 is held in elevated position during the first part of its movement, but during the latter part of the movement of the cam the rod 18 is allowed to descend, the hooks 17 being thereby brought into engagement with the lugs 19 on the pendulums. The operative connection between the cam 25 and the arm 24 is such that when the cam is rotated to the right the arm 24 is also swung to the right about its pivot and the finger 20 thereby raised into engagement with the projection 21 on the tare beam lever 3. Owing to the fact that the tare beam lever 3 is raised during the early part of the movement of the finger 20, while the pendulums 12 are not locked until the latter part of the movement of the cam 25, the pendulums are always allowed to swing into their lowermost positions before the hooks 17 descend.

A handle 27 is fixed to the arm 24 and a suitable lost motion connection between the arm 24 and the cam 25 is provided so that the tare beam lever may, if desired, be locked by turning the handle 27 to the right without locking the pendulum mechanism. The tare beam lever lock is useful to protect the pendulum mechanism from injury by shocks due to heavy articles being thrown suddenly upon the scale platform.

The cam is operated by means of a handle (not shown) in the lower part of the column which is connected to a pull rod 29.

Figure 4:
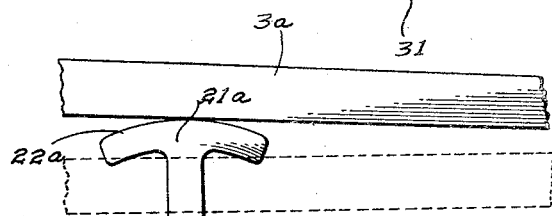
Figure 4 is a view similar to Figure 2 showing a modified beam elevating means.

In Figure 4 I have shown a modified form of means for raising the tare beam lever which differs from that already described principally in that the arcuate surface is placed upon the finger instead of on the beam. As shown, the finger $20^a$ is provided at its free end with an enlargement $21^a$ having an arcuate surface $22^a$. The finger $20^a$ is fixed to a shaft $23^a$ and a threaded bolt $24^a$ passes through the shaft $23^a$ and the boss which surrounds the shaft. The opening in the shaft $23^a$ is threaded so that by turning the bolt $24^a$ the distance of the head of the bolt from the shaft may be adjusted. The bolt may then be locked in adjusted position by means of the lock nut $25^a$.

When the parts are in the position shown in dotted lines in Figure 4 the head of the bolt $24^a$ forms a stop to limit the downward movement of the lever $3^a$. When the shaft $23^a$ is turned the upper end of the enlargement $21^a$ strikes the lower surface of the tare beam lever and moves it upwardly until the lever reaches the position shown in full lines, in which its lower surface is tangent to a circle of which the arcuate surface $22^a$ of the enlargement $21^a$ forms a part. Further movement of the finger $20^a$ does not result in further elevation of the lever, but the lever is held in the position shown in full lines in Figure 4 during such further movement. The function of the device shown in Figure 4 is, therefore, substantially the same as that shown in Figure 2.

In sealing a scale of this type it is advisable to first seal the tare beams—that is, to so adjust the beam weighing mechanism that when the poises are moved to graduations corresponding respectively to loads upon the platform of the scale the indicator hand will remain at zero, the load on the platform being exactly counterbalanced by the poises on the beams.

After the beams have been sealed it is customary to seal the automatic mechanism. During this operation the poises on the beams are allowed to remain at zero, while the automatic weighing mechanism is so adjusted that the weight of any load within the capacity of the chart will be indicated by the hand 15.

The beams and automatic mechanism having been sealed, it would seem that the scale would weigh properly when the beams and automatic mechanism were used together. If, for example, a load weighing 750 lbs. be placed upon the platform and the poises on the beam set at 500 lbs., it would seem that the indicating hand 15 should register with the 250 lb. graduation on the chart. It has been found, however, that even though the beam mechanism weigh correctly when used without the automatic weighing mechanism and the automatic weighing mechanism weigh correctly when used without the beams, a scale will often weigh incorrectly when the beams and automatic weighing mechanism are used together. The reason for this discrepancy is found to be that when the poises are at the zero ends of the beams the pendulum effect of the tare beam lever and the parts carried thereby is likely to be different from the pendulum effect of the lever when the poises are at the capacity ends of the beams, because the center of mass of the combined lever, beams and poises is raised or lowered as the poises are moved along the beam. This change in the height of the center of mass has no effect when the beams are used without the automatic weighing mechanism except to effect the sensitiveness of the scale, because the beams are always in the same position regardless of whether the load being weighed is 5 lbs. or 500 lbs., but when the automatic weighing mechanism is used the position of the beams changes with each change in the weight of the load offset by the automatic mechanism. This change in the position of the beam has no effect on the weighing so long as the height of the center of mass of the beam remains the same, but when the height of the center of mass of the beam is changed by movement of the poise therealong the pendulum effect of the beam varies with each change in position of the poise.

When the tare and capacity beams are in ideal position they are parallel to the range line of the pivots of the tare beam lever, but even though the tare beams be parallel to the range line of the pivots when the scale is new, this parallelism is destroyed as soon as the pivots are subjected to any wear. It should, therefore, be possible to change the angle of the tare beam levers relative to the range line of the pivots.

Another matter which affects the accuracy of the scale is the position of the steelyard rod 5 relative to the range line of the pivots. When the pull of the steelyard rod is not substantially perpendicular to the range line of the pivots the movement of the beam is accelerated or retarded, according to which way the steelyard rod inclines from the perpendicular. If the steelyard rod be properly located when the scale is new, the wear of the pivots will cause the range line to shift in such a way as to retard the movement of the beam and thereby decrease the sensitiveness of the scale, and this decrease in sensitiveness due to wrong angular relation of the pivot range line and the steelyard rod becomes more noticeable as the load being weighed increases. Such decrease in sensitiveness may be overcome by elevating the capacity ends of the beam and thus raising the center of mass of the beam and parts carried thereby. So elevating the capacity end of the beam tends to make the beam increasingly accelerating as the poises are moved toward its capacity end. This elevation of the capacity end of the beams to compensate for change in angular relation of the steelyard rod and range line is in addition to the elevation required because of the destruction of the parallel relation of the beams and pivot range line.

In this invention I have overcome the difficulties above outlined by so mounting the capacity ends of the beams 30 and 31 that the height of the capacity ends of the beams may be adjusted. In this embodiment of the invention the beams 30 and 31 are secured at the upper and lower ends on a plate 32 which is connected to the tare beam lever by means of screws 33 which pass through slots 34 in the plate 32. By loosening the screws 33 the plate 32 may be raised or lowered and it may then be clamped in such raised or lowered position by tightening the screws.

With this construction if it be found that the automatic weighing mechanism of the scale, after having been sealed with the poises 35 and 36 at zero, weighs "slow" with the poises at full capacity, the defect may be cured by simply raising the plate 32. If the automatic weighing mechanism weighs "fast" with the poises at full capacity, the defect may be corrected by lowering the plate 32.

While it will be apparent that the illustrated embodiment of my invention herein shown is well calculated to adequately fulfill the objects primarily stated, it is to be understood that the invention is susceptible to variation, modification and change within the spirit and scope of the subjoined claims.

Having described my invention, I claim:

1. In a weighing scale, in combination, automatic weighing mechanism, a beam lever connected thereto, beams mounted upon said beam lever, and adjustable means for varying the height of said beams with respect to said beam lever.

2. In a weighing scale, in combination, automatic weighing mechanism, a beam lever connected thereto, beams mounted upon said beam lever, and adjustable means for varying the angle of said beams with respect to the range line of the pivot edges of said beam lever.

3. In a weighing scale, in combination, automatic weighing mechanism, a tare beam lever connected thereto, a tare beam mounted upon said tare beam lever, and adjustable means for varying the height of one end of said tare beam.

4. In a weighing scale, in combination, automatic weighing mechanism, a beam lever connected thereto, a beam mounted upon said beam lever, and adjustable means for varying the height of the capacity end of said beam.

5. In a weighing scale, in combination, a tare beam lever, a pair of tare beams each secured at one end to said lever, a plate secured to the other end of each of said tare beams, and means for adjustably securing said plate to said tare beam lever.

6. In a weighing scale, in combination, weighing mechanism including a lever, and locking mechanism for said weighing mechanism including a manually movable member engageable with said lever, the engaging portions of said lever and member including an arcuate face whereby said member may be moved through a portion of its path of movement while said lever remains stationary.

7. In a weighing scale, in combination, weighing mechanism including a lever, and locking mechanism for said weighing mechanism including a pivoted member mounted adjacent said lever and engageable therewith, the engaging portions of said member and lever including an arcuate face adapted to hold said lever stationary during a portion of the movement of said member.

8. In a weighing scale, in combination, weighing mechanism including a lever, and locking mechanism for said weighing mechanism including a member mounted for pivotal movement adjacent to and engageable with said lever, the engaging portions of said lever and member being so constructed that said lever is elevated during the first part of a movement of said member and is held in elevated position during the remainder of said movement.

9. In a weighing scale, in combination, weighing mechanism including a lever, and locking mechanism for said weighing mechanism including means for lifting and locking said lever comprising a projection on said lever, said projection having an arcuate face, and a pivoted finger adapted to engage said projection when said lever is in lowered position, the parts being so arranged that the arcuate face of said projection is concentric to the pivotal axis of said finger when the lever is in elevated position.

10. In a weighing scale, in combination, automatic weighing mechanism, a tare beam lever connected thereto, means for raising said tare beam lever comprising a pivoted finger, a projection on said lever, said projection having an arcuate face, the parts being so arranged that when said lever is in elevated position the arcuate face of said projection is concentric to the pivotal axis of said finger, means for turning said finger about its axis, means for locking said automatic mechanism, and an operative connection between said locking means and said finger turning means.

11. In a weighing scale, in combination, automatic load-offsetting mechanism, means for locking said automatic load-offsetting mechanism, a delayed action cam for operating said locking means, a tare beam lever connected to said automatic mechanism, means for raising and locking said tare beam lever comprising a projection on said lever, said projection having an arcuate face, a pivoted finger adapted to engage said projection and lift said lever during the first part of its movement and to ride over said arcuate face during the latter part of its movement, and an operative connection between said finger and said delayed action cam.

HALVOR O. HEM.